United States Patent
Myles et al.

(10) Patent No.: US 8,975,344 B2
(45) Date of Patent: Mar. 10, 2015

(54) POLYESTER/POLYCARBONATE BLOCK COPOLYMERS VIA ONE-POT, NEAT RING OPENING POLYMERIZATION

(71) Applicants: Xerox Corporation, Norwalk, CT (US); National Research Council of Canada, Ottawa (CA)

(72) Inventors: Andrew J Myles, Edmonton (CA); Karen A Moffat, Brantford (CA); Jordan H Wosnick, Toronto (CA); Valerie M Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/938,256

(22) Filed: Jul. 10, 2013

(65) Prior Publication Data

US 2015/0018496 A1    Jan. 15, 2015

(51) Int. Cl.
*C08G 63/91* (2006.01)
*C08G 63/82* (2006.01)

(52) U.S. Cl.
CPC .................................. *C08G 63/823* (2013.01)
USPC ........... 525/415; 525/410; 525/411; 525/450; 525/466

(58) Field of Classification Search
USPC .................. 525/410, 411, 413, 415, 450, 466
See application file for complete search history.

(56) References Cited

U.S. PATENT DOCUMENTS

2010/0304287 A1*  12/2010  Wosnick et al. ........... 430/108.4
2011/0151566 A1*  6/2011  Hedrick et al. ............... 435/455

OTHER PUBLICATIONS

Mindemark, J.; Functional Cyclic Carbonate Monomers and Polycarbonates, May 4, 2012, p. 11-22.*
Kadota, J., et al.; Macromolecules, 2010, p. 8874-8879.*
Reinhardt, H.J., et al.; White Paper: Inerting in the chemical industry, 2010, p. 1-16.*

* cited by examiner

*Primary Examiner* — Robert Jones, Jr.
(74) *Attorney, Agent, or Firm* — MDIP LLC

(57) ABSTRACT

The instant disclosure describes polyester synthesis processes, including processes for the ring-opening polymerization (ROP) of cyclic organic monomer components and components comprising a functional group using an organocatalyst system to effect ROP-based block copolymer preparation.

20 Claims, 2 Drawing Sheets

POLYESTER/POLYCARBONATE BLOCK COPOLYMERS VIA ONE-POT, NEAT RING OPENING POLYMERIZATION

FIELD

The present disclosure is generally directed to polyester synthesis processes and, more specifically, to processes for the ring-opening polymerization (ROP) of cyclic monomers using an organocatalyst system to obtain ROP-based block copolymer preparation.

BACKGROUND

Ring-opening polymerization (ROP) of lactones and lactides is an addition polymerization reaction where the terminal end of a polymer acts as a reactive center and cyclic monomers join to form a larger polymer chain. In the case of a polylactide, an alkoxide of some metal having d-orbitals, like aluminum and tin, are considered to be good initiators for ROP of lactide (see, e.g., Biopolymers From Renewable Resources, Hartmann et al. (eds.), 1998, Spring-Verlag, Berlin, herein incorporated by reference in entirety). Stannous octoate or tin(II) bis-2-ethylhexanoic acid is the catalyst which has been researched most thoroughly and is generally used for bulk polymerization for lactide because of solubility in lactide, good reaction rate, high conversion, racemization of less than 1% and synthesis of higher molecular weight polymers (see, e.g., Du et al., Macromolecules (1995) 28(7): 2124, herein incorporated in entirety).

Metal-free purely organic catalysts have been reported using either tertiary amines or phosphines as nucleophilic transesterification catalysts (see, e.g., Nederberg et al., Agnew Chem Int Ed (2001) 40:2712; Nederberg et al., Chem Comm (2001) 2006; Kamber et al., Chem Rev (2007) 107: 5813, herein incorporated by reference in entirety.) A more recent class of organocatalysts for ROP are the N-heterocyclic carbenes (NHCs) which have been studied in the polymerization of $\epsilon$-caprolactone to provide polycaprolactones with controlled molecular weight and low polydispersity (see, e.g., Kamber et al., Macromolecules (2009) 42(5): 1634, herein incorporated by reference in entirety.) All those processes rely on stringent anhydrous conditions and many involve reactions under pressure with solvent.

Polylactide may be copolymerized with a number of different monomers including other lactone monomers, such as, glycolide and caprolactone. Block copolymers of polycaprolactone and polylactide may be prepared in two ways: first, via a sequential addition of the required monomer on the living growing chain end of the first monomer; and second, by making a prepolymer with a hydroxyl end group to which the second monomer may be added in the presence of a catalyst (see, e.g., Bero et al., Polym Bull (1993) 21:9: Veld et al., J Polym Sci Part A Polym Chem (1997) 35:219, herein incorporated by reference in entirety).

The reactivity of lactone monomers is much lower than that of lactide monomers which generally proscribes one-pot processes. Thus, there remains a need to generate lactone/lactide-based copolymers in a single process format.

SUMMARY

The present disclosure provides methods for the production of polyester polymer resins comprising a pendant group suitable for use in manufacturing toners in a single process format (i.e., one-pot), including a method which uses an organocatalyst that facilitates ROP of, for example, a cyclic carbonate, a cyclic ester and a cyclic diester monomer to prepare block copolymers.

In embodiments, an ROP process is disclosed comprising contacting a cyclic carbonate monomer, a first cyclic component and a second cyclic component with at least one catalyst and an initiator, polymerizing the cyclic carbonate monomer, the first cyclic component and the second cyclic component coincidentally or sequentially, in any order, to form a block copolymer resin, and recovering the block copolymer resin, where the polymerization is carried out under neat conditions in a single vessel under atmospheric conditions.

In embodiments, a process is disclosed including contacting a cyclic carbonate monomer, a first cyclic component and a second cyclic component with at least one catalyst and an initiator, polymerizing the cyclic carbonate monomer, the first cyclic component and the second cyclic component to form a block copolymer resin, where the first and second cyclic components comprise glycolide, $\beta$-propiolactone, $\beta$-butyrolactone, $\gamma$-butyrolactone, $\gamma$-valerolactone, $\gamma$-valerolactone, $\epsilon$-caprolactone, D,D-lactide, L,L-lactide, D,L-lactide, 4-(benzyloxymethyl)-1,3-dioxolan-2-one (BDMC), 4-(hydroxymethyl)-1,3-dioxolan-2-one (DMCOH), succinic anhydride, glutaric anhydride, maleic anhydride, styrene oxide, cyclohexene oxide, 4-(sulfonatophenyl)caprolactone, cyclopentane-1,2-dicarboxylic anhydride, cyclohexene-1,2-dicarboxylic anhydride, 2,3-bicyclo[2,2,2]octadicarboxylic anhydride, phthalic anhydride, naphthalene-dicarboxylic anhydride, pyridine-dicarboxylic anhydride, thiophene-dicarboxylic anhydride, cyclohexene oxide or combinations thereof, and recovering the block copolymer resin, where the polymerization is carried out under neat conditions in a single vessel under standard pressure and ambient humidity.

In embodiments, a ring-opening polymerization (ROP) process is disclosed comprising contacting a first cyclic component, at least one catalyst and at least one initiator; polymerizing the first cyclic component to form a homopolymer; contacting the homopolymer and a cyclic carbonate; polymerizing the cyclic carbonate to the homopolymer to form a first block copolymer; contacting the first block copolymer and a second cyclic component; and polymerizing the second cyclic component to the first block copolymer to form a second block copolymer; wherein the polymerization is carried out under neat conditions in a single vessel.

The disclosure relates to an ROP comprising contacting a carbonate monomer, a first cyclic component, a second cyclic component, at least one catalyst and at least one initiator; and polymerizing the carbonate monomer, the first cyclic component and the second cyclic component to form a block copolymer; wherein the polymerization is carried out under neat conditions in a single vessel.

BRIEF DESCRIPTION OF THE DRAWINGS

Various embodiments of the present disclosure will be described with reference to the figures listed below.

DETAILED DESCRIPTION

Figure 1:
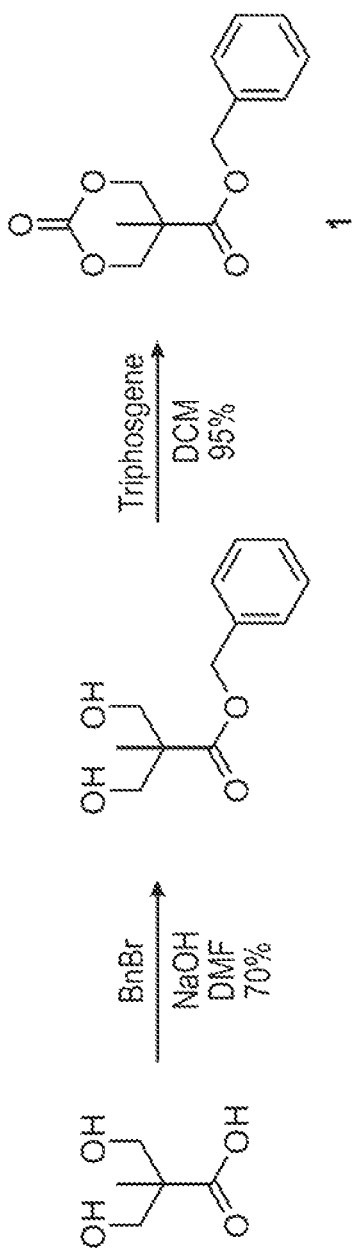
FIG. 1 shows the synthesis of functionalized carbonate monomer.

In the specification and the claims that follow, singular forms such as "a," "an," and, "the," include plural forms unless the content clearly dictates otherwise. All ranges disclosed herein include, unless specifically indicated, all endpoints and intermediate values. In addition, reference may be made to a number of terms that shall be defined as follows:

The term, "functional group," refers, for example, to a group of atoms arranged in a way that determines the chemical properties of the group and the molecule to which it is attached. Examples of functional groups include halogen atoms, hydroxyl groups, carboxylic acid groups and the like.

The term, "short-chain," refers, for example, to hydrocarbon chains wherein the backbone can comprise from 1 to about 7, from about 2 to about 6, about 3 to about 5 carbon atoms in the chain.

The terms, "one or more," and, "at least one," refer, for example, to instances in which one of the subsequently described circumstances occurs, and to instances in which more than one of the subsequently described circumstances occurs.

The term, "neat," refers to conditions performed with a reagent with no additional or added standard solvent or cosolvent.

One skilled in the art will also readily recognize that where methods or compositions are disclosed, the invention encompasses not only such compositions or processes and other subcomponents or positive process steps, but may also exclude one or more components, subcomponents, functional groups, or steps therein, as used, for example, in an explicit negative limitation. The disclosure therefore envisages the explicit exclusion of any one or more components, subcomponents, functional groups, elements, species, or embodiments, including provisos that may apply to any of the disclosed embodiments, whereby any one or more components, subcomponents, elements, functional groups, species, or embodiments, may be excluded.

Block copolymer self-assembly using biodegradable components is an attractive means to generate discrete nanostructured materials for applications ranging from commodity items to drug delivery systems. Aliphatic polyesters, such as, polycaprolactone and polylactide generated by ring-opening polymerization (ROP), represent classes of non-toxic and biodegradable polymers. Functionalization and self-assembly of same is an approach that may be used to generate complex soft materials (Pounder & Dove, Polym Chem (2010) 1:260-271; Dove, Chem Commun (2008) 6446-6470; Klishetti et al., Proc Natl Acad Sci USA (2010) 107:17939-17944; Nottelet et al., J Pol Sci A: Polym Chem (2010) 48:3244-3254, each one of which is incorporated by reference in entirety).

Functionalization of caprolactones (Hao et al., J Mat Chem (2011) 21:10523-10628, herein incorporated by reference in entirety) and lactides (Noga et al., Biomacromol (2008) 9:2056-2062; Thillaye du Boullay et al., J Am Chem Soc (2006) 128:16442-16443; Leemhuis et al., Macromol (2006) 39:3500-3508, each of which is incorporated by reference in entirety) remains a challenge and requires multi-step syntheses, non-scalable processes and/or suffers from poor yields.

Adding a block of 2, 3, 4, 5 or more, carboxylic acid functionalities along a polymer backbone may promote self-assembly of block co-polymers in aqueous medium. The process disclosed herein produces ABA or ABC triblock copolymers where B is a short piece with plural pendant functionalities, such as, plural carboxylic acid groups, carboxylic acid salt groups or combination thereof.

In embodiments, a process is disclosed to generate functionalized block copolymers of a polyester/polycarbonate hybrid via organocatalytic neat ROP (Kamber et al., J L Chem Rev (2007) 107:5813-5840, herein incorporated by reference in entirety). In embodiments, due to the difficulty in accessing functional lactides and caprolactones, a functionalized cyclic carbonate monomer 1 of Formula (I) was synthesized in 2 steps from commercially available material and isolated in good yield (Pratt et al., Chem Comm (2008) 114-116, herein incorporated by reference in entirety) as shown in FIG. 1.

Carbonate 1

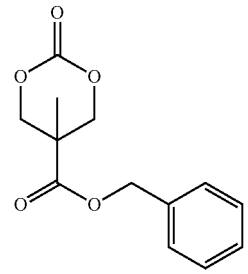

Hence, in one embodiment, to a solution of starting material, such as, benzylated 2,2-bis(hydroxymethyl)propionic acid) (7.0 g, 0.031 moles) and pyridine (14.7 g, 0.186 moles) in $CH_2Cl_2$ (anhydrous, 90 ml) cooled to $-78°$ C. in a dry ice/acetone bath was added triphosgene (4.6 g, 0.0155 moles) in $CH_2Cl_2$ (anhydrous, 20 ml) dropwise over 1 hour. The reaction mixture was allowed to warm to room temperature over 2 hours, after which the reaction was quenched by adding saturated $NH_4Cl$ (50 ml). The organic layer was separated, washed with 1M HCl (3×100 ml) and saturated $NaHCO_3$ (100 ml), dried over $MgSO_4$, filtered and the solvent was removed in vacuo. The crude product was recrystallized from ethyl acetate to yield pure 1 (3.5 g, 45%) as a white crystalline solid.

In an alternative method, to a solution of starting material (benzylated 2,2-bis(hydroxymethyl)propionic acid) (49.0 g, 0.218 moles) in tetrahydrofuran (THF) (anhydrous, 600 ml) cooled in an ice/water bath was added ethyl chloroformate (52.2 g, 0.481 moles). The reaction mixture was allowed to stir for 10 minutes, after which triethylamine (53.0 g, 0.523 moles) was added dropwise over 30 minutes. The reaction mixture was allowed to warm to room temperature and then was stirred for 18 hours, after which the precipitate was removed by filtration. The crude product was isolated by removing the solvent of the filtrate in vacuo. The crude product was recrystallized from ethyl acetate to yield pure 1 (25.2 g, 46%) as a white crystalline solid.

Figure 2:
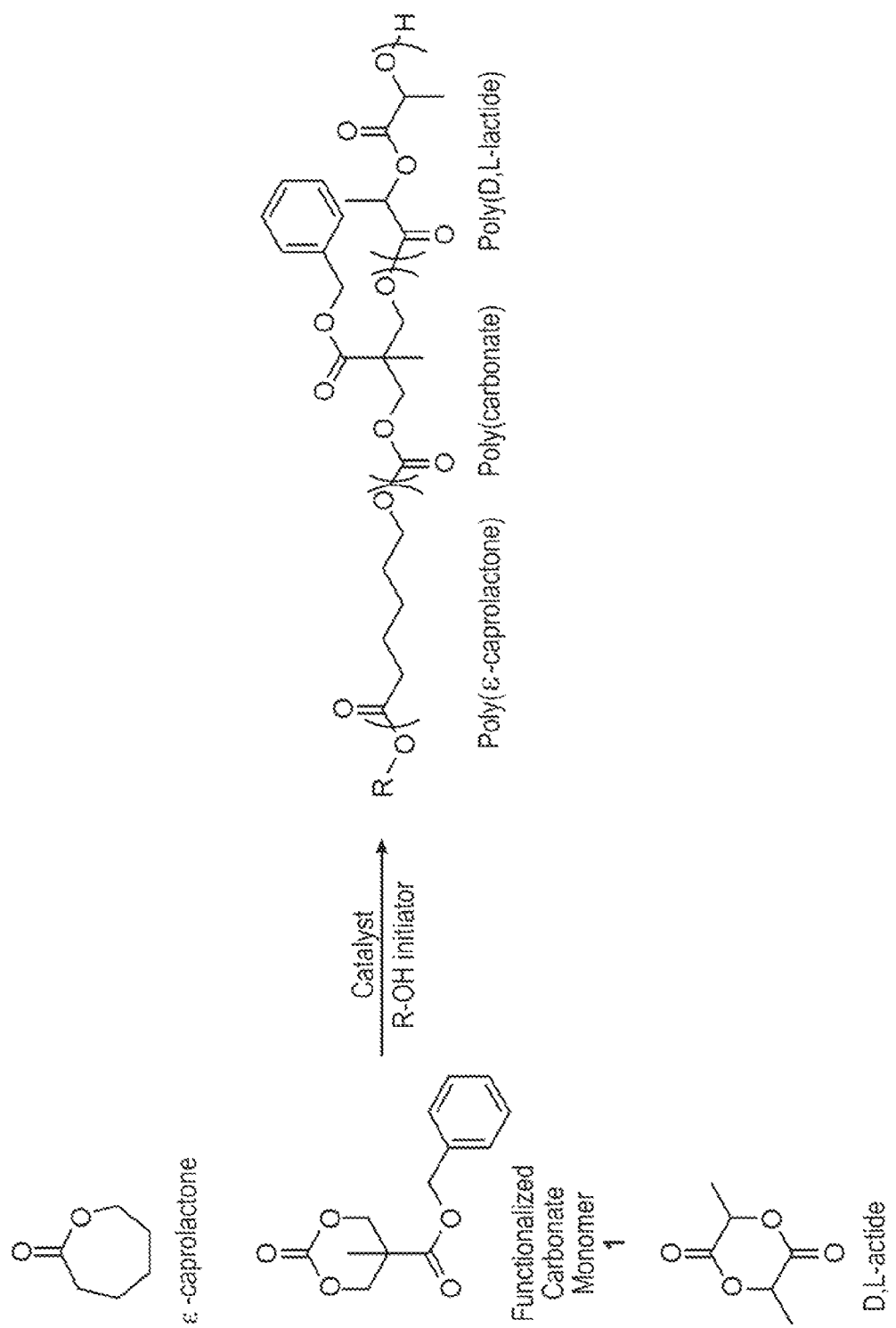
FIG. 2 shows the synthesis of functionalized polyester-polycarbonate block copolymer.

In embodiments, cyclic carbonate monomers are polymerized via ROP similarly to lactide and caprolactone (Pratt et al., Chem Comm (2008) 114-116). In embodiments, a one-pot ROP synthesis process may be used to generate carbonate 1 homopolymers as well as the block copolymer as shown in FIG. 2 using a directed and sequential addition of two or more monomers. In embodiments, the protecting group on the carboxylic acid functionality may be removed to provide pendent carboxylic acid groups which enable self-assembly of the copolymers. Only 2-3 functional units are needed with mass ranging from 500 to 1000 g/mole. The increase in $M_n$ and $M_w$ resulting from the functionalized residues is small relative to the entire length of the block copolymer. For example, in a triblock copolymer, the mass of a polycaprolactone block can vary from 3000 daltons up to 15000 daltons, or higher, and the mass of the polylactide block can vary from 3000 daltons up to 15000 daltons, or higher In embodiments, the process occurs under neat conditions (i.e., no added solvent or cosolvent), in the absence of anhydrous conditions (e.g., may be conducted under ambient conditions, that is, open to air), without an inert gas blanket or under pressure (e.g., may be conducted under standard pressure of 1 atm) to make, for example, a polycaprolactone-b-carbonate-b-lactide triblock copolymer with high conversion and low polydispersity. An organocatalyst system can be used, e.g., 4-(dimethylamino)pyridine (DMAP) with DMAP: $HO_3SCF_3$ (trifluoro methane sulfonic acid) as the catalyst (see, e.g., FIG. 2). Other simple organic molecules, such as, 4-pyrrolidinopyridine (PPY), phosphines in the presence of a suitable nucleophilic initiator (see, e.g., Myers et al., J Polym Sci Part A: Polym Chem (2002) 40:844; Nederberg et al., Agnew Chem Int Ed (2001) 40:2712; Biela et al., Makromol Chem (1983) 184:811, each of which herein is incorporated in entirety) and so on.

In embodiments, processes of the present disclosure may be utilized to produce homopolymers and block copolymers including distinct crystalline polyester blocks and distinct amorphous polyester blocks. By suitable choice and use of monomers and block sizes, polyesters containing one or more amorphous blocks linked to one or more crystalline blocks may be prepared as a design choice.

In embodiments, other starting materials beside cyclic carbonate monomers, lactones and lactides may be utilized to form the desired block copolymers. For example, the ring opening (RO) copolymerization of cyclic anhydrides, cyclic carbonates, epoxides and combinations thereof, may also be used to form copolymers of the present disclosure.

Resins

Any monomer or starting material suitable for preparing a resin for a toner may be utilized. In embodiments of the present disclosure, the resin may be a block copolymer comprising an amorphous polyester block and a separate crystalline polyester block formed by the ROP of cyclic components.

The diesterification of carbonic acid with hydroxyl compounds leads to the formation of stable organic compounds known as organic carbonates. Depending on the nature of hydroxyl compounds, the resulting carbonates are either diakyl, diaryl or substituted diakyl diaryl carbonates. Methods of preparing organic carbonates, include, but are not limited to, phosgenation, oxidative carbonylation of alcohols and/or phenols; reactions of urea with alcohols and/or phenols; reaction of oxiranes with carbon dioxide; carbonate interchange reaction; synthesis may be from halohydrins; from alcohols and carbon monoxide by elemental sulfur; alicyclic carbonate from halogenated carbonates; from carbon dioxide, alcohol, and alkyl halide; from carbon dioxide, alcohol and triphenolphosphine; from carbon dioxide, alcohol, and dialkoxydibutyltin; alkylation of alkali metal carbonate (see, e.g., Shaikh & Sivaram, Chem Rev (1996) 96:951-976, herein incorporated by reference in entirety) and so on.

In embodiments, useful carbonates include, but are not limited to, unsaturated carbonate monomers, symmetrical carbonate monomers, asymmetrical carbonate monomers, aliphatic carbonate monomers, cyclic carbonate monomers, aromatic carbonate monomers, aliphatic-aromatic carbonate monomers, alicyclic carbonate monomers, thiocarbonate monomers, imidocarbonate monomers, linear carbonate monomers, branched carbonate monomers, substituted carbonate monomers, functionalized carbonate monomers, and combinations thereof.

As to the cyclic components polymerizable by ROP, the cyclic monomers or dimers of aliphatic hydroxycarboxylic acids may be used. Examples of those include, but are not limited to, lactide, glycolide, β-propiolactone, β-butyrolactone, γ-butyrolactone, γ-valerolactone, γ-valerolactone, ε-caprolactone and the like.

In the case of asymmetric carbon atoms within the hydroxy carboxylic acid unit, each of the D-form and the L-form, as well as mixtures of both may be used. Racemic mixtures may also be used. By way of example, the D,D-lactide is the cyclic dimer made of two D-lactic acid moieties, the L,L-lactide is the cyclic dimer made of two L-lactic acid moieties, and the meso lactide is the dimer made of one D-lactic acid and one L-lactic acid. D,L-lactide designates a racemic mixture of D,D-lactide and L,L-lactide.

Other cyclic components polymerizable by ROP include cyclic carbonates, such as, 5-membered to 7-membered cyclic carbonates. In embodiments, cyclic components comprise 4-(benzyloxymethyl)-1,3-dioxolan-2-one (BDMC) and 4-(hydroxymethyl)-1,3-dioxolan-2-one (DMCOH).

Other cyclic components may include cyclic anhydrides, epoxides, combinations thereof and the like. Suitable cyclic anhydrides include, but are not limited to, aliphatic dicarboxylic anhydrides, such as, succinic anhydride, glutaric anhydride, maleic anhydride and combinations thereof. Examples of epoxides include styrene oxide, cyclohexene oxide, combinations thereof and the like.

As noted above, in embodiments, the starting materials, such as, lactones, may be chosen such that one of the formed blocks may be amorphous in nature, and the other may be crystalline. Examples of lactones that produce amorphous polyesters in block ROP include 4-tert-butylcaprolactone, 4-phenylcaprolactone, 4-methylcaprolactone and isomers thereof, 3,5-dimethylcaprolactone and isomers thereof, 3-isochromanone, lactide, glycolide, 4-(sulfonatophenyl)caprolactone, cyclic anhydrides, such as, cyclopentane-1,2-dicarboxylic anhydride, cyclohexene-1,2-dicarboxylic anhydride, 2,3-bicyclo[2,2,2]octadicarboxylic anhydride and so on. Examples of aromatic dicarboxylic anhydrides include phthalic anhydride, naphthalene-dicarboxylic anhydride, pyridine-dicarboxylic anhydride, thiophene-dicarboxylic anhydride, epoxides, such as, styrene oxide and derivatives thereof, cyclohexene oxide, combinations thereof, and the like.

The choice of monomers used in the reactions governs the composition, behavior, characteristics and properties of the resulting polymers and the blocks thereof as a design choice. Hence, particular monomers can be used, reaction times can be controlled and so on to obtain copolymers of the desired composition and properties. Hence, as noted above, lactide monomers yield amorphous blocks and caprolactone monomers yield crystalline blocks. As discussed above, a triblock copolymer can be product by performing ROP of caprolactone, adding a cyclic carbonate monomer to the reaction mixture to produce the functionalized carboxylic acid block and then adding a lactide monomer into the same pot to produce the triblock copolymer consisting of a crystalline segment, the functionalized acid segment and the amorphous segment in a single molecule. The order and length of the blocks is controlled by the selected use of a monomer at a particular time during construction process and controlling the length of the polymerization reactions during the formation of each block.

Catalysts

In embodiments, the ROP described herein may take place in the presence of a catalyst, in embodiments, in the presence of at least one catalyst. Catalysts which may be utilized to form the copolymers of the present disclosure include organic nucleophilic transesterification catalysts. The catalysts may mediate ROP by quasi-living polymerization mechanisms, suitable for the formation of block copolymers with chemically distinct blocks. In embodiments, such catalysts include 4-(dimethylamino)pyridine (DMAP)-DMAP:HX catalysts, where HX includes mineral acids, such as, HCl, HBr, sulfuric acid, nitric acid, phosphoric acid or the like; organic acids, such as, formic acid, acetic acid, trifluoroacetic acid, trichloroacetic acid, methanesulfonic acid, triflic acid, or the like; or mixtures or combinations thereof. In embodiments, the catalyst is a two component organic transesterification system comprising DMAP and DMAP:$HO_3SCF_3$ (triflic acid).

The catalysts utilized to form the polyester copolymers of the present disclosure should operate at temperatures of from about 100° C. to about 170° C., in embodiments from about 135° C. to about 165° C. from about 150° C. to about 160° C., although temperatures outside those ranges may be utilized.

Same or different catalysts may be utilized to form a crystalline block and an amorphous block.

In embodiments, the amount of catalyst or catalysts utilized to catalyze a reaction may be from about 0.01% by weight to about 10% by weight based on the starting materials used to generate the copolymer polyester resin, from about 0.1% by weight to about 6% by weight based on the starting materials used to generate the copolymer polyester resin, although amounts outside those ranges may be utilized.

Initiators

In embodiments, the ROP described herein may take place in the presence of an initiator or at least one initiator. Initiators which may be utilized include monohydric organic alcohols (i.e., monoalcohols).

Such monoalcohols include those having from 1 to about 40, from about 1 to about 18 carbon atoms; polymeric alcohols; or tetrafluoroethylene-based telomer alcohols. Examples of specific types of monoalcohols include the various aliphatic and aromatic alcohols, and the like, alcohols, such as, alkyl alcohols, for example, methyl alcohol, ethyl alcohol, propyl alcohol, hexanol and the like, or olefinic alcohols, for example, allyl alcohol and the like, alicyclic alcohols, for example, cyclohexanol and the like, heterocyclic alcohols, for example, furfuryl alcohol and the like; and so on. Various aromatic alcohols include benzyl alcohol and the like. Halogenated organic alcohols, such as, fluoroalcohols having from 2 to 18 carbon atoms may be used, such as, trifluoroethanol, heptafluorobutanol, heptadecylfluorooctanol and the like. Monohydric alcohols include benzyl alcohol, trifluoroethanol, heptafluorobutanol, pentafluoropropanol, pentafluorobutanol, nonafluorohexanol, various perfluoroalkylethanols and allyl alcohol.

The initiator can operate at temperatures of from about 100° C. to about 170° C., from about 135° C. to about 165° C., from about 150° C. to about 160° C., although temperatures outside those ranges may be utilized.

Same or different initiators may be utilized to form a crystalline block or an amorphous block.

In embodiments, the total amount of initiator(s) may be from about 0.01% by weight to about 10% by weight based on the starting materials, from about 0.1% by weight to about 6% by weight based on the starting materials, although amounts outside those ranges may be utilized.

In embodiments, polyester homopolymers may be used as initiators, for example, in embodiments, the initiator may be, for example, polycaprolactone, polylactide or polycarbonate.

Reaction Conditions

The starting materials utilized to form the polymer resin of the present disclosure, for example, the carbonates, lactides, lactones, cyclic anhydrides, and/or cyclic carbonates described above, may be combined with the above catalysts and initiator and a polyester may be formed. The polymerization is performed in the absence of solvents.

In the polymerization process, the reactants may be added to a suitable reactor, such as, a mixing vessel. The appropriate amount of starting materials may be added to a catalyst and an initiator and a polyester homopolymer or block copolymer formed may then be used in the production of a toner.

The order, amount and timing of adding the reactants to the reaction mixture in the single vessel are design choices based on the product copolymer desired, and can take into account the reaction kinetics of the varying reactants and intermediates.

Formation of blocks is sequential depending on the sequential or ordered addition of plural reagents to the reaction mixture. For example, in embodiments, a catalyst and starting material may be utilized to form a homopolymer, a first block, the block allowed to form, followed by addition of the starting material utilized to form the second and any succeeding blocks or certain composition based on the monomer added at each step. In such a case, the starting material for one of the blocks, sometimes referred to herein as a first component, may be contacted with a catalyst, followed by polymerizing the first component to form a first block of a polyester resin. The first block may then be contacted with the starting material to form a second block of the first block copolyester, sometimes referred to herein as a second component, followed by polymerizing the second component to form a second block of the first copolyester resin linked to the first block. The first copolymer may then be used as starting material that is contacted with the same material forming the first block or a third component to form a third block of the second block copolymer. The resulting block copolyester resin, which may include a crystalline block and an amorphous block, may then be recovered.

The starting materials may be at a monomer:catalyst:initiator ratio of from about 10:1 in mmoles to about 40:1 in mmoles, where the catalyst/initiator amount represents an aggregate amount of the reagents used, such as, if three reagents are used (e.g., 0.28 mmoles DMAP [catalyst], 0.28 mmoles DMAP:$HO_3SCF_3$ [catalyst], and 0.28 mmoles benzyl alcohol [initiator]), from about 15:1 to about 35:1, from about 20:1 to about 30:1, although amounts outside those ranges may be used.

As noted above, in embodiments, multiple carbonates, lactides, lactones, cyclic anhydrides, cyclic carbonates and/or epoxides may be utilized in forming a crystalline block in the resulting block copolymer, and at least one other lactide/lactone may be utilized in forming an amorphous block in the resulting copolymer. Suitable starting materials (e.g., carbonates, cyclic components, catalysts, and initiators) may be those as described above. The number, ordering and composition of blocks are design choices.

The time for the reaction may depend on the type and amount of starting materials utilized, the amount of catalyst utilized, the temperature of the reaction, the desired size of the copolymer product and the like. In embodiments, the reaction mixture may be mixed for from about 1 min to about 72 hrs, from about 10 mins to about 24 hrs (although times outside those ranges can be used), while keeping the temperature within the operational range of the catalyst being used, from about 100° C. to about 135° C., from about 135° C. to about 150° C., from about 150° C. to about 165° C., although temperatures outside those ranges may be used.

Those skilled in the art will recognize that optimization of reaction conditions, temperature, initiator loading, catalyst loading and the like can be varied to generate polymers of various composition, properties, molecular weight and so on, and that structurally related starting materials may be polymerized using comparable techniques.

The resins thus produced may include crystalline blocks having a glass transition temperature (Tg) of from about −60°

C. to about 200° C., from about −50° C. to about 20° C., and a melting temperature of from about 20° C. to about 200° C., from about 55° C. to about 95° C. The resins may include amorphous blocks having a glass transition temperature (Tg) of from about 0° C. to about 200° C. from about 5° C. to about 70° C.

The block copolymers can be of any size as a design choice, for example, by altering reaction conditions, such as, reaction time. For example, a copolymer may have a weight average molecular weight ($M_w$), as measured by gel permeation chromatography (GPC), of, for example, from about 500 to about 50,000, from about 1,000 to about 40,000, from about 2000 to about 30,000. The molecular weight distribution ($M_w/M_n$) of the copolymer may be, for example, from about 1.0 to about 1.3, from about 1.05 to about 1.25, from about 1.1 to about 1.2. In embodiments, the PDI may be less than about 1.4, less than about 1.3, less than about 1.2 and so on.

The resulting copolymer may possess crystalline blocks in amounts of from about 1 to about 90% by weight of the block copolymer, from about 5 to about 30% by weight of the block copolymer, and amorphous blocks in amounts of from about 10 to about 99% by weight of the block copolymer, from about 70 to about 95% by weight of the block copolymer.

The weight of the resulting polymers may depend, for example, on the starting materials, reaction conditions and the catalyst being used. Higher temperatures, about 135° C. or above, and longer reaction times, for example, about 48 or more hours, can yield polymers with higher molecular weight.

The final copolymer can be used in any known uses and material employing a polyester, such as, adhesives, sheeting material, clothing material, fabrics, cushioning, insulation, containers, roping, applications using fibers and so on. In embodiments, a copolymer of interest may be utilized to form toner particles.

Toner

The homopolymer or block copolymer resin described above may then be utilized to form toner compositions. Other resins known in the art can be combined with a copolymer of interest in a toner. Toner compositions of the present disclosure may also include optional colorants, waxes and other additives. Toners may be formed utilizing any method within the purview of those skilled in the art.

Surfactants

In embodiments, colorants, waxes and other additives utilized to form toner compositions may be in dispersions including surfactants. Moreover, toner particles may be formed by emulsion aggregation methods where the copolymer resin described above and other components of the toner are mixed with one or more surfactants, an emulsion is formed, toner particles are aggregated, coalesced, optionally washed and dried, and recovered.

One, two or more surfactants may be utilized. The surfactants may be selected from ionic surfactants and nonionic surfactants. Anionic surfactants and cationic surfactants are encompassed by the term, "ionic surfactants." In embodiments, the surfactant may be utilized so that it is present in an amount of from about 0.01% to about 5% by weight of the toner composition, for example, from about 0.75% to about 4% by weight of the toner composition, in embodiments, from about 1% to about 3% by weight of the toner composition, although amounts outside those ranges may be utilized.

Examples of nonionic surfactants that may be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, available from Rhone-Poulenc as IGEPAL CA-210M, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block co-polymer of polyethylene oxide and polypropylene oxide, including those commercially available as SYNPERONIC PE/F, in embodiments, SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN®, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}, C_{15}, C_{17}$-trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Colorants

As the colorant that can be added, various known suitable colorants, such as dyes, pigments, mixtures of dyes, mixtures of pigments, mixtures of dyes and pigments, and the like, may be included in the toner. The colorant may be included in the toner in an amount of, for example, 0 to about 35% by weight of the toner, from about 1 to about 15 wt % of the toner, from about 3 to about 10% by weight of the toner, although amounts outside those ranges may be utilized.

As examples of suitable colorants, mention may be made of carbon black like REGAL 330™; magnetites, such as Mobay magnetites MO8029™, MO8060™; Columbian magnetites; MAPICO BLACKS™ and surface treated magnetites: Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof.

Specific examples of pigments include SUNSPERSE 6000, FLEXIVERSE and AQUATONE water-based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants may be selected, such as, Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations thereof and the like.

Wax

Optionally, a wax may also be combined with the resin in forming toner particles. When included, the wax may be present in an amount of, for example, from about 1 wt % to about 25 wt % of the toner particles, from about 5 wt % to about 20 wt % of the toner particles, although amounts outside those ranges may be utilized.

Waxes that may be selected include waxes having, for example, a weight average molecular weight of from about 500 to about 20,000, from about 1,000 to about 10,000, although weights outside those ranges may be utilized.

Waxes that may be used include, for example, polyolefins such as polyethylene, polypropylene, and polybutene waxes, such as, commercially available from Allied Chemical and Petrolite Corporation, for example, POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as, carnauba wax, rice wax, candelilla wax, sumacs wax and jojoba oil; animal-based waxes, such as, beeswax; mineral-based waxes and petroleum-based waxes, such as, montan wax, ozokerite, ceresin, paraffin wax, microcrystalline wax, and Fischer-Tropsch wax; ester waxes obtained from higher fatty acid and higher alcohol, such as, stearyl stearate and behenyl behenate; ester waxes obtained from higher fatty acid and monovalent or multivalent lower alcohol, such as, butyl stearate, propyl oleate, glyceride monostearate, glyceride distearate and pentaerythritol tetra behenate; ester waxes obtained from higher fatty acid and multivalent alcohol multimers, such as, diethyleneglycol monostearate, dipropyleneglycol distearate, diglyceryl distearate and triglyceryl tetrastearate; sorbitan higher fatty acid ester waxes, such as, sorbitan monostearate, and cholesterol higher fatty acid ester waxes, such as, cholesteryl stearate. Examples of functionalized waxes that may be used include, for example, amines, amides, for example, AQUA SUPERSLIP 6550™, SUPERSLIP 6530™ available from Micro Powder Inc., fluorinated waxes, for example, POLYFLUO 190™, POLYFLUO 200™, POLYSILK 19™, POLYSILK 14™ available from Micro Powder Inc., mixed fluorinated, amide waxes, for example, MICROSPERSION 19™ also available from Micro Powder Inc., imides, esters, quaternary amines, carboxylic acids or acrylic polymer emulsion, for example, JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents.

Toner Preparation

The toner particles may be prepared by any method within the purview of one skilled in the art. Although embodiments relating to toner particle production are described below with respect to emulsion-aggregation (EA) processes, any suitable method of preparing toner panicles may be used, including chemical processes, such as suspension and encapsulation processes disclosed in U.S. Pat. Nos. 5,290,654 and 5,302,486, the disclosure of each of which hereby is incorporated by reference in entirety.

In embodiments, toner compositions may be prepared by emulsion-aggregation processes, such as, a process that includes aggregating a mixture of an optional colorant, an optional wax and any other desired or required additives, and emulsions including the copolymer resins described above, optionally in surfactants as described above, optionally with other resins, and then coalescing the aggregated mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 4 to about 5, although a pH outside that range may be utilized. Additionally, in embodiments, the mixture may be homogenized, for example, by mixing at about 600 to about 4,000 rpm, although speeds outside that range may be utilized.

Following contacting the reagents, an aggregating agent may be added to the mixture. Suitable aggregating agents include, for example, aqueous solutions of a divalent cation or a multivalent cation material. The aggregating agent may be, for example, polyaluminum halides, such as, polyaluminum chloride (PAC), or the corresponding bromide, fluoride, or iodide; polyaluminum silicates, such as, polyaluminum sulfosilicate (PASS), and water-soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. In embodiments, the aggregating agent may be added to the mixture at a temperature that is below the Tg of the resin.

The aggregating agent may be added to the mixture utilized to form a toner in an amount of, for example, from about 0.1% to about 8% by weight, from about 0.2% to about 5% by weight, from about 0.5% to about 5% by weight, of the resin in the mixture, although amounts outside those ranges may be utilized.

To control aggregation and coalescence of the particles, in embodiments, the aggregating agent may be metered into the mixture over time. The addition of the agent may also be done while the mixture is maintained under stirred conditions, in embodiments, from about 50 rpm to about 1,000 rpm, from about 100 rpm to about 500 rpm (although speeds outside those ranges may be utilized), and at a temperature that is below the Tg of the resin as discussed above, from about 30° C. to about 90° C., from about 35° C. to about 70° C., although temperatures outside those ranges may be utilized.

The particles may be permitted to aggregate until a predetermined desired particle size is obtained. The aggregation may proceed by maintaining the elevated temperature, or by slowly raising the temperature to, for example, from about 40° C. to about 100° C. (although temperatures outside that range may be utilized), and holding the mixture at that temperature for a time from about 0.5 hrs to about 6 his, from about 1 hr to about 5 hrs (although times outside those ranges maybe utilized), while maintaining stirring, to provide the aggregated particles. Once the predetermined desired particle size is reached, then the growth process is halted.

After aggregation, but prior to coalescence, once the desired final size of the toner particles is achieved, the pH of the mixture may be adjusted with a base to a value of from about 3 to about 10, from about 5 to about 9, although pH outside those ranges may be utilized. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof and the like. In embodiments, ethylene diamine tetraacetic acid (EDTA) may be added to help adjust the pH to the desired values noted above. In embodiments, a buffer is used to adjust pH.

Following aggregation, the particles can be exposed to a resin to form a shell thereover. Any resin can be used, and the resin can be applied as known in the art.

Following aggregation to the desired particle size, the particles may then be coalesced to the desired final shape, the coalescence being achieved by, for example, heating the mixture to a temperature of from about 65° C. to about 105° C., from about 70° C. to about 95° C. (although temperatures outside those ranges may be utilized), which may be at or above the Tg of the resin, and/or increasing the stirring, for example, to from about 400 rpm to about 1,000 rpm, from about 500 rpm to about 800 rpm, although speeds outside those ranges may be utilized. Higher or lower temperatures may be used, it being understood that the temperature is a function of the resins used for the binder. Coalescence may be accomplished over a period of from about 0.1 to about 9 hours, from about 0.5 to about 4 hours, although times outside those ranges may be utilized.

After aggregation and/or coalescence, the mixture may be cooled to room temperature (RT), such as, from about 20° C. to about 25° C. The cooling may be rapid or slow, as desired. A suitable cooling method may include introducing cold water to a jacket around the reactor. After cooling, the toner particles may be optionally washed with water and then dried. Drying may be accomplished by any suitable method for drying including, for example, freeze-drying.

Additives

In embodiments, the toner particles may also contain other optional surface additives, as desired or required. For example, the toner may include positive or negative charge control agents, for example in an amount of from about 0.1 to about 10% by weight of the toner, from about 1 to about 3% by weight of the toner, although amounts outside those ranges may be utilized. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in entirety; organic sulfate and sulfonate compositions, including those disclosed in U.S. Pat. No. 4,338,390, the disclosure of which is hereby incorporated by reference in entirety; cetyl pyridinium tetrafluoroborates; distearyl dimethyl ammonium methyl sulfate; aluminum salts such as BONTRON E84™ or E88™ (Hodogaya Chemical); combinations thereof, and the like. Such charge control agents may be applied simultaneously with a shell resin or after application of a shell resin.

There may also be blended with the toner particles external additive particles including flow aid additives, which additives may be present on the surface of the toner particles, Examples of those additives include metal oxides, such as, titanium oxide, silicon oxide, tin oxide, mixtures thereof, and the like; colloidal and amorphous silicas, such as, AEROSIL®, metal salts and metal salts of fatty acids inclusive of zinc stearate, aluminum oxides, cerium oxides, and mixtures thereof. Each of these external additives may be present in an amount of from about 0.1% by weight to about 5% by weight of the toner, from about 0.25% by weight to about 3% by weight of the toner, although amounts outside those ranges may be utilized. Suitable additives include those disclosed in U.S. Pat. Nos. 3,590,000, 3,800,588, and 6,214,507, the disclosure of each of which hereby is incorporated by reference in entirety.

In embodiments, toners of the present disclosure may be utilized as low melt polyester toners. In embodiments, the dry toner particles, exclusive of external surface additives, may have the following characteristics:

(1) volume average diameter (also referred to as "volume average particle diameter") of from about 3 to about 25 μm, from about 4 to about 15 μm, from about 5 to about 12 μm, although values outside those ranges may be obtained;

(2) number average geometric size distribution (GSDn) and/or volume average geometric size distribution (GSDv) of from about 1.05 to about 1.55, from about 1.1 to about 1.4, although values outside those ranges may be obtained; and (3) circularity of from about 0.9 to about 0.99, although values outside those ranges may be obtained (measured with, for example, a Sysmex FPIA 2100 analyzer).

The characteristics of the toner particles may be determined by any suitable technique and apparatus. Volume average particle diameter $D_{50v}$, GSDv and GSDn may be measured by means of a measuring instrument such as, a Beckman Coulter MULTISIZER 3.

Toners of the present disclosure may possess a parent toner charge per mass ratio (q/m) of from about −3 μC/g to about −35 μC/g, and a final toner charging after surface additive blending of from −5 μC/g to about −50 μC/g, although values outside those ranges may be obtained.

Developers

The toner particles may be formulated into a two-component developer composition with a carrier. The toner concentration in the developer may be from about 1% to about 25% by weight of the total weight of the developer, from about 2% to about 15% by weight, although amounts outside those ranges may be utilized.

Carriers

Examples of carrier particles that may be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide and the like. Other carriers include those disclosed in U.S. Pat. Nos. 3,847,604, 4,937,166, and 4,935,326.

The selected carrier particles can be used with or without a coating. The carrier particles may include a core with a coating thereover which may be formed from a mixture of polymers that are not in close proximity thereto in the triboelectric series. The coating may include fluoropolymers. The coating may have a coating weight of, for example, from about 0.1 to about 5% by weight of the carrier, from about 0.5 to about 2% by weight of the carrier, although amounts outside those ranges may be utilized. The coating may comprise a colorant, such as, a black colorant.

Various effective suitable means may be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof and the like. The mixture of carrier core particles and polymer may then be heated to enable the polymer to melt and to fuse to the carrier core panicles. The coated carrier particles may then be cooled and thereafter classified to a desired particle size.

Uses

The polymerization synthesis according to the present disclosure may be used to prepare resins for use in subsequent synthesis of emulsion aggregation toners either in the absence of solvents. Copolymers possessing both crystalline and amorphous blocks may be produced. The disclosed synthesis also provides for reduced reaction times and energy cost, since a single copolymer may be utilized in the production of toners, instead of separate crystalline polyesters and amorphous polyesters.

In addition, lactones suitable for polymerization are available commercially, making the starting materials relatively inexpensive since the lactones are widely used in other industries, for example, as fragrances, food additives, and the like.

Imaging

The toners may be utilized for electrophotographic or xerographic processes, including those disclosed in U.S. Pat. No. 4,295,990, the disclosure of which is hereby incorporated by reference in entirety. In embodiments, any known type of image development system may be used in an image developing device, including, for example, magnetic brush development, jumping single-component development, hybrid scavengeless development (HSD) and the like. Those and similar development systems are within the purview of those skilled in the art.

The following Examples are submitted to illustrate embodiments of the present disclosure. The Examples are intended to be illustrative only and are not intended to limit the scope of the present disclosure. Also, parts and percentages are by weight unless otherwise indicated.

EXAMPLES

Example 1

Procedure for the Homopolymerization of Carbonate Monomer 1 (Degree of Polymerization (DP)=10)

Into a 16×125 mm test tube equipped with a small magnetic stir bar were added DMAP (49 mg, 0.4 mmol, 0.1 eq), DMAP:$HO_3SCF_3$ (109 mg, 0.4 mmol, 0.1 eq), carbonate monomer 1 (1.0 g, 4.0 mmol, 1 eq) and hexanol (50 μl, 41 mg, 0.4 mmol, 0.1 eq). The mixture was heated in an oil bath to 135° C., and stirring commenced on melting (~1 minute). Samples were taken throughout the polymerization for GPC analysis and the results are shown in Table 1.

TABLE 1

GPC analysis of homopolymerized carbonate monomer 1.

| Time | Mn | Mw | PDI |
| --- | --- | --- | --- |
| 1 min | 1387 | 1473 | 1.06 |
| 2 min | 1529 | 1683 | 1.10 |
| 3 min | 1682 | 1877 | 1.11 |
| 4 min | 1720 | 1934 | 1.12 |
| 5 min | 1779 | 2025 | 1.13 |
| 10 min | 1939 | 2266 | 1.16 |
| 15 min | 1966 | 2306 | 1.17 |
| 20 min | 1953 | 2293 | 1.17 |

A steady increase in the Mn and Mw was observed while maintaining a low polydispersity, demonstrating that the catalytic system used is effective for the polymerization of the functional carbonate monomer 1 and can be conducted in the one-pot, neat synthetic process, which also can be used with caprolactone and lactide.

$^1$H-NMR of the resulting polymer showed a homopolymer was obtained which compared well with the literature (Al-Azemi & Bisht, Macromolecules (1999) 32:6536-6540, herein incorporated by reference in entirety), namely, broadened peaks at 7.2, 51, 4.2, and 1.2 ppm, demonstrating that polymerization was successful.

Example 2

General Procedure for Polycaprolactone (PCL)(25)-Polycarbonate (PCarb1)(5)-Polylactide (PLA)(25) Triblock Copolymer Into a 16×125 mm test tube equipped with a small magnetic stir bar were added DMAP (68 mg, 0.56 mmol, 0.04 eq), DMAP:$HO_3SCF_3$ (152 mg, 0.56 mmol, 0.4 eq), ε-caprolactone (CL) (1.60 g, 0.014 mol, 1 eq), and hexanol (70 μl, 57 mg, 0.56 mmol, 0.04 eq). The mixture was heated in an oil bath to 135° C. The first block of 25 residues was allowed to polymerize over 24 hours, at which time benzyl-carboxy carbonate monomer 1 (Carb1) (700 mg, 0.0028 mol, 0.2 eq) was added directly to the tube. The second block of five residues was allowed to polymerize for 5 minutes, after which time D,L-lactide (LA) (2.0 g, 0.014 mmol, 1 eq) was added directly to the tube. The third block of 25 residues was allowed to polymerize for 5 minutes and the resulting clear melt was poured onto aluminum foil and allowed to cool to room temperature. The organocatalytic approach to living ROP was done neat, with no need for elaborate glassware setup, solvents or inert gas blanket.

TABLE 2

GPC analysis of block copolymer.

| Sample | Mn | Mw | DI |
|---|---|---|---|
| PCL mono-block | 4583 | 5740 | 1.25 |
| PCL-PCarb1 di-block | 5353 | 6238 | 1.16 |
| PCL-PCarb1-PLA tri-block | 5839 | 7268 | 1.24 |

GPC revealed an increase in Mn and Mw on addition of each monomer while maintaining a low polydispersity (Table 2), indicating living polymerization and formation of a block copolymer. $^1$H-NMR was obtained for the first block showing the polycaprolactone peak at 4.05 ppm as well as unreacted monomer at 4.2 ppm. On addition of the carbonate monomer 1, $^1$H-NMR revealed new peaks corresponding to the polymer of carbonate 1. $^1$H-NMR was performed on the crude product and showed the presence of polycaprolactone, polycarbonate and polylactide peaks.

Example 3

Another Triblock Copolymer

The process of Example 2 was repeated with the reagent amounts and reaction times altered to obtain a triblock copolymer of the configuration, PCL(25):PCarb1(2.5):PLA (25).

GPC traces showed a growing polymer chain rather than additional initiation events with the addition of each new monomer. The crude polymer had an Mn=8239, Mw=9704 and PDI=1.17. The HNMR analysis revealed the expected resonance for each block.

Example 4

General Procedure for polycaprolactone(25)-polycarbonate(2.5) Diblock Copolymer

Into a 16×125 mm test tube equipped with a small magnetic stir bar were added DMAP (136 mg, 1.12 mmol, 0.04 eq). DMAP:HO$_3$SCF$_3$ (304 mg, 1.12 mmol, 0.4 eq), ε-caprolactone (3.20 g, 0.028 mol, 1 eq), and hexanol (140 μl, 114 mg, 1.12 mmol, 0.04 eq). The mixture was heated in an oil bath to 135° C. The first block was allowed to polymerize over 24 hours, at which time benzyl-carboxy carbonate monomer 1 (700 mg, 0.0028 mol, 0.1 eq) was added. The second block was allowed to polymerize for 10 mins and the resulting clear melt was poured onto aluminum foil and allowed to cool to room temperature. The organocatalytic approach to living ROP was done neat, with no need for elaborate glassware setup, solvents or inert gas blanket. The GPC results are shown in Table 3.

TABLE 3

GPC analysis of block copolymer.

| Sample | Mn | Mw | PDI |
|---|---|---|---|
| PCL mono-block | 4437 | 5006 | 1.12 |
| PCL-PCarb1 di-block | 4887 | 5469 | 1.11 |

Example 5

General Procedure for polycaprolactone(50)-polycarbonate(5)-polylactide(50) Triblock Copolymer Into a 200 ml freeze dry flask equipped with a small magnetic stir bar were added DMAP (1 g, 0.0088 mol, 0.02 eq), DMAP:HO$_3$SCF$_3$ (2.4 g, 0.0088 mol, 0.02 eq), ε-caprolactone (50 g, 0.44 mol, 1 eq) and hexanol (1.1 ml, 0.90 g, 0.0088 mol, 0.02 eq). The mixture was heated in an oil bath to 135° C. with vigorous stirring. The first block was allowed to polymerize over 40 hours, at which time the magnetic stir bar was replaced with a 4 blade mechanical overhead stirrer and the benzyl-carboxy carbonate monomer 1 (11.0 g, 0.044 mol, 0.1 eq) was added. The second block was allowed to polymerize for 20 minutes, after which time D,L-lactide (63.4 g, 0.44 mol, 1 eq) was added. The third block was allowed to polymerize for 20 minutes and the resulting clear melt was poured into an aluminum pan and allowed to cool to room temperature. The crude polymer was ground up using a mortar and pestle, then soaked in cold methanol (800 ml) overnight. The white precipitate was collected and dried in vacuo.

TABLE 4

GPC Monitor of Triblock Copolymer

| Sample | Mn | Mw | PDI |
|---|---|---|---|
| PCL mono-block | 5032 | 7872 | 1.56 |
| PCL-PCarb1 di-block | 5421 | 8218 | 1.51 |
| PCL-PCarb1-PLA triblock | 10251 | 13352 | 1.30 |

The (PC data provided in Table 4 shows an increase in molecular weight as well as low polydispersity of the purified triblock copolymer. $^1$H NMR of the pure triblock copolymer showed resonances correlating to each block in the ratio expected.

It will be appreciated that various of the above-disclosed and other features and functions, or alternatives thereof, may be desirably combined into many other different systems or applications. Also various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color or material.

All references cited herein are incorporated by reference in entirety.

We claim:
1. A ring-opening polymerization (ROP) comprising:
 a. contacting a first cyclic component, at least one catalyst and at least one initiator;
 b. polymerizing the first cyclic component to form a homopolymer;
 c. contacting the homopolymer and a cyclic carbonate;

d. polymerizing the cyclic carbonate to the homopolymer to form a first block copolymer;

e. contacting the first block copolymer and a second cyclic component; and f. polymerizing the second cyclic component to the first block copolymer to form a second block copolymer;

wherein the contacting and polymerizing are carried out under neat conditions, without an inert gas blanket, in a single vessel.

2. The ROP of claim 1, wherein the first and second cyclic components are selected from the group consisting of glycolide, β-propiolactone, β-butyrolactone, γ-butyrolactone, γ-valerolactone, ε-caprolactone, D,D-lactide, L,L-lactide, D,L-lactide, 4-(benzyloxymethyl)-1,3-dioxolan-2-one (BDMC), 4-(hydroxymethyl)-1,3-dioxolan-2-one (DM-COH), succinic anhydride, glutaric anhydride, maleic anhydride, styrene oxide, cyclohexene oxide, 4-(sulfonatophenyl) caprolactone, cyclopentane-1,2-dicarboxylic anhydride, cyclohexene-1,2-dicarboxylic anhydride and 2,3-bicyclo[2,2,2]octadicarboxylic anhydride, phthalic anhydride, naphthalene-dicarboxylic anhydride, pyridine-dicarboxylic anhydride, thiophene-dicarboxylic anhydride, and combinations thereof.

3. The ROP of claim 1, wherein the at least one catalyst comprises two components of a nucleophilic transesterification system.

4. The ROP of claim 1, wherein the at least one catalyst comprises 4-(dimethylamino)pyridine (DMAP) and DMAP:HX, wherein HX is selected from the group consisting of HCl, HBr, sulfuric acid, nitric acid, phosphoric acid, formic acid, acetic acid, trifluoroacetic acid, trichloroacetic acid, triflic acid or combinations thereof.

5. The ROP of claim 1, wherein the first cyclic component and the second cyclic component are the same.

6. The ROP of claim 1, wherein the at least one initiator is selected from the group consisting of hexanol, methyl alcohol, ethyl alcohol, propyl alcohol, allyl alcohol, cyclohexanol, furfuryl alcohol, benzyl alcohol, trifluoroethanol, heptafluorobutanol, heptadecylfluorooctanol, pentafluoropropanol, pentafluorobutanol, nonafluorohexanol and fluoroalkylethanols.

7. The ROP of claim 1, wherein the cyclic carbonate comprises the structure:

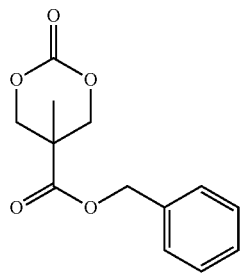

8. The ROP of claim 1, wherein the second block copolymer comprises a polydispersity of less than about 1.3.

9. The ROP of claim 1, wherein the second block copolymer comprises an Mw of between about 500 and about 50,000.

10. The ROP of claim 1, wherein the first cyclic component comprises ε-caprolactone and the second cyclic component comprises a lactide.

11. A ring-opening polymerization (ROP) comprising:
contacting a carbonate monomer, a first cyclic component, a second cyclic component, at least one catalyst and at least one initiator, and polymerizing the carbonate monomer, the first cyclic component and the second cyclic component to form a block copolymer;

wherein the contacting and polymerizing are carried out under neat conditions, without an inert gas blanket, in a single vessel.

12. The ROP of claim 11, wherein the first and second cyclic components are selected from the group consisting of glycolide, β-propiolactone, β-butyrolactone, γ-butyrolactone, γ-valerolactone, ε-caprolactone, D,D-lactide, L,L-lactide, D,L-lactide, 4-(benzyloxymethyl)-1,3-dioxolan-2-one (BDMC), 4-(hydroxymethyl)-1,3-dioxolan-2-one (DM-COH), succinic anhydride, glutaric anhydride, maleic anhydride, styrene oxide, cyclohexene oxide, 4-(sulfonatophenyl) caprolactone, cyclopentane-1,2-dicarboxylic anhydride, cyclohexene-1,2-dicarboxylic anhydride and 2,3-bicyclo[2,2,2]octadicarboxylic anhydride, phthalic anhydride, naphthalene-dicarboxylic anhydride, pyridine-dicarboxylic anhydride, thiophene-dicarboxylic anhydride, and combinations thereof.

13. The ROP of claim 11, wherein the at least one catalyst comprises two components of a nucleophilic transesterification system.

14. The ROP of claim 11, wherein the at least one catalyst comprises 4-(dimethylamino)pyridine (DMAP) and DMAP:HX, wherein HX is selected from the group consisting of HCl, HBr, sulfuric acid, nitric acid, phosphoric acid, formic acid, acetic acid, trifluoroacetic acid, trichloroacetic acid, triflic acid or combinations thereof.

15. The ROP of claim 11, wherein the first cyclic component and the second cyclic component are the same.

16. The ROP of claim 11, wherein the at least one initiator is selected from the group consisting of hexanol, methyl alcohol, ethyl alcohol, propyl alcohol, allyl alcohol, cyclohexanol, furfuryl alcohol, benzyl alcohol, trifluoroethanol, heptafluorobutanol, heptadecylfluorooctanol, pentafluoropropanol, pentafluorobutanol, nonafluorohexanol and fluoroalkylethanols.

17. The ROP of claim 11, wherein the carbonate monomer comprises the structure:

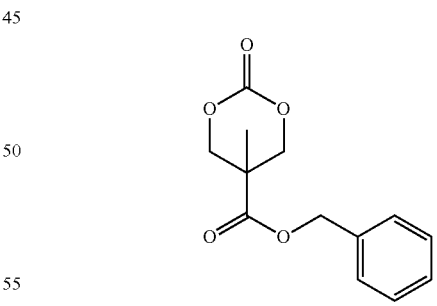

18. The ROP of claim 11, wherein the block copolymer comprises a polydispersity of less than about 1.3.

19. The ROP of claim 11, wherein the block copolymer comprises a Mw of between about 500 and about 50,000.

20. The ROP of claim 11, wherein the first cyclic component comprises ε-caprolactone and the second cyclic component comprises a lactide.

* * * * *